United States Patent [19]

Divigalpitiya et al.

[11] Patent Number: 4,996,108
[45] Date of Patent: Feb. 26, 1991

[54] SHEETS OF TRANSITION METAL DICHALCOGENIDES

[75] Inventors: W. M. Ranjith Divigalpitiya; Robert F. Frindt, both of Vancouver; S. Roy Morrison, Burnaby, all of Canada

[73] Assignee: Simon Fraser University, Burnaby, Canada

[21] Appl. No.: 297,464

[22] Filed: Jan. 17, 1989

[51] Int. Cl.$^5$ .............................................. B05D 1/18
[52] U.S. Cl. .................................. 428/411.1; 423/53; 423/62; 423/561.1; 427/430.1; 428/698; 428/704; 429/195; 429/199; 502/215; 502/219; 502/220
[58] Field of Search ........................ 423/53, 62, 561.1; 427/430.1; 428/698, 704, 411.1; 429/195, 199; 502/215, 219, 220

[56] References Cited

U.S. PATENT DOCUMENTS 4,299,892  11/1981  Dines .................................. 429/194
4,647,386   3/1987  Jamison ................................ 252/25

OTHER PUBLICATIONS

P. Joensen, R. F. Frindt and S. R. Morrison, Single Layer MoS2, Materials Research Bulletin, vol. 21, pp. 457–461, 1986.
M. A. Gee, R. F. Frindt, P. Joensen and S. R. Morrison, Inclusion Compounds of MoS2, Materials Research Bulletin, vol. 21, pp. 543–549, 1986.
K. Blodgett, Films Built by Depositing Successive Monomolecular Layers on a Solid Surface, American Chemical Society Journal, 57, pp. 1007–1022, 1935.
L. E. Scriven and C. V. Sternling, Marangoni Effects, Nature, 187, pp. 186–188, 1960.
P. D. Fleishauer, Fundamental Aspects of the Electronic Structure, Materials Properties and Lubrication Performance of Sputtered MoS2 Films, Thin Solid Films, 154, pp. 309–322, 1987.
D. Djemal, N. Muller, U. Lachish and D. Cahen, Photoelectrochemical Cells Using Polycrystalline and Thin MoS2 Electrodes, Solar Energy Materials, 5, pp. 403–416, 1981.

*Primary Examiner*—Bernard Pianalto
*Attorney, Agent, or Firm*—Shlesinger & Myers

[57] ABSTRACT

Compositions of the formula $MX_2:Y$, wherein $MX_2$ is a layer type transition metal dichalcogenide, M is a metal selected from the group consisting of niobium, tantalum, molybdenum and tungsten, X is a chalcogen selected from the group consisting of sulfur and selenium and Y is a material located between layers of $MX_2$. The compositions may be prepared by the steps of first forming a suspension of the $MX_2$ in a body of water. A liquid which is immiscible with water is added to the suspension. The suspension and immiscible liquid are agitated together to form a temporary emulsion. The emulsion is allowed to rest until the water and the liquid separate with an interface therebetween. A sheet-like composition of $MX_2:Y$ forms at the interface. Preferably, the $MX_2$ is in exfoliated, singular molecular thickness layers suspended in the water.

26 Claims, 9 Drawing Sheets

SHEETS OF TRANSITION METAL DICHALCOGENIDES

FIELD OF THE INVENTION

This invention relates to sheets or films of transition metal dichalcogenides, particularly molybdenum disulfide.

BACKGROUND OF THE INVENTION

It has recently been found, as disclosed in pending U.S. patent application No. 855,517, now U.S. Pat. No. 4,822,590 that singular molecular layers of layer-type transition metal dichalcogenides, such as $MoS_2$, $TaS_2$ and $WS_2$, can be prepared by intercalating such compounds with lithium and then reacting the intercalated compound with water. This gives rise to a suspension of single molecular layers of the transition metal dichalcogenides in water.

Attempts have been made in the past to produce sheet-like forms of metal dichalcogenides as revealed, for example, in U.S. Pat. No. 4,299,892 to Dines and Chianelli. Here, an amorphous transition metal dichalcogenide product is prepared by low temperature non-aqueous precipitation of the compound from mixtures of the metal salts. The amorphous products are converted into sheets of metal dichalcogenides referred to in the patent as having a "rag-like" structure by controlled heating at temperatures between 250° and 400° C. However, neither the end product, nor the intermediate product, are oriented films or sheets, that is films or sheets wherein the crystalline c-axes of single layers of the metal dichalcogenide are aligned.

U.S. Pat. No. 4,647,386 to Jamieson discloses an intercalated transition metal based solid lubricating composition. A transition metal dichalcogenide is intercalated with a metal, preferably a coinage metal.

SUMMARY OF THE INVENTION

The invention provides a process for forming sheet-like compositions of the formula $MX_2{:}Y$, wherein $MX_2$ is a layer-type transition metal dichalcogenide, M is a metal selected from the group consisting of niobium, tantalum, molybdenum and tungsten, X is a chalcogen selected from the sulfur and selenium and Y is a material located between layers of $MX_2$. The process includes the steps of forming a suspension of the $MX_2$ in water and adding a liquid which is immiscible with water to the suspension to form a mixture. The mixture is agitated to form a temporary emulsion. The emulsion is allowed to rest until the water and the liquid separate with an interface therebetween. A sheet-like composition of $MX_2{:}Y$ forms at the interface. $MX_2$ has a crystalline structure with c-axes aligned in a direction perpendicular to the plane of the layers.

Preferably, the $MX_2$ suspension comprises exfoliated layers of $MX_2$. The composition then comprises one molecular thickness layers of the $MX_2$. These layers may be separated by molecules of the water immiscible liquid, water molecules or molecules of a foreign substance dissolved in the liquid.

The invention also relates to compositions prepared according to the processes described above. The compositions maY be used to coat objects.

The invention provides thin, aligned sheets or films and coatings of transition metal dichalcogenides by a relatively expeditious process which can be readily scaled to provide large area films and coatings. These coatings or films have unique qualities. For example, such thin, oriented films of molybdenum disulfide have unique optical qualities and can be used as selective filters. These films are believed to have advantageous lubrication qualities when compared with non-oriented films. Because thin, highly oriented films of $MoS_2$ can be deposited on curved surfaces, the invention may be used to make relatively inexpensive, large area energy selective X-ray focusing devices. The invention also provides unique layered compositions which may be utilized for the composition of the transition metal dichalcogenide, for the properties of other substances between layers of the metal dichalcogenides or combinations of the two. For example, the optical properties of $MoS_2$ in combination with the other organic molecules between $MoS_2$ layers can be used as selective optical filters.

BRIEF DESCRIPTION OF THE DRAWINGS

In the drawings:

FIG. 2 is an enlarged view of the portion within the circle in FIG. 1a;

DESCRIPTION OF THE PREFERRED EMBODIMENTS

A process for preparing single layers of molybdenum disulfide in water is described in detail in pending U.S. patent application Ser. No. 855,517. The process involves exfoliating a lithium intercalated layered transition metal dichalcogenide, such as $MoS_2$, $TaS_2$, $NbS_2$ or $WS_2$ by immersion in water. Selenium may replace the sulfur as the dichalcogen.

In one example molybdenum disulfide powder was soaked in a solution of n-butyl lithium in hexane for about 48 hours in a dry box containing an argon atmosphere. Once the molybdenum disulfide was fully intercalated with lithium ions between the layers of molybdenum disulfide, the product was removed and washed repeatedly in hexane, dried and sealed in a vial while still in the dry box under argon atmosphere. The vial was then removed from the dry box, immersed in water, and the cap removed from the vial. Upon contact of the contents of the vial with liquid water, copious gas evolution followed and the molybdenum disulfide powder formed a highly opaque suspension in the water. The suspension was agitated, in this case ultrasonicated, during the reaction to assist in the exfoliation. The hydrogen gas produced by the reaction between the lithium and the water pushed the layers of molybdenum disulfide apart until they were completely separated. The suspension was repeatedly centrifuged and washed with distilled water. A final concentration of molybdenum disulfide of about 5 mg/cc of water was produced.

The formation of films or sheet-like forms of transition metal dichalcogenides begins with the single layer suspension of molybdenum disulfide in water obtained above. Referring FIG. 1a, a liquid 21 is immiscible with water and, in this case, has a density less than water. Various organic solvents were tested including alkanes, alkenes and butyl alcohol (n-butyl and iso-butyl). As described below, iron pentacarbonyl was also used as the immiscible liquid. The liquid was added to the suspension of molybdenum disulfide in water to form a two-phase liquid 23. The suspended molybdenum disulfide stays in the water.

The mixture was then shaken as indicated by arrows 25 and formed an unstable emulsion containing globules of water in the liquid. The molybdenum disulfide layers placed themselves at the surfaces of the resulting globules of water. When the shaking ceased, these globules gradually migrated towards the water/liquid interface 27 where they coalesced with each other. The molybdenum disulfide molecular layers formed a film at the horizontal interface 27 between the two liquids. With moderate shaking, both the water and the water immiscible liquid became clear. Therefore, all of the molybdenum disulfide was in the interface film as shown to the right of FIG. 1a. Clear water 20.1 remained below the film.

It was found, qualitatively, that the lower the pH of the water, the more rapid the accumulation of the molybdenum disulfide at the interface. The accumulation of molybdenum disulfide at the interface occurred faster with alcohol than with alkanes or alkenes. After the interface is formed, it is possible to further transfer the molybdenum disulfide layers to the alcohol but not the alkanes or alkenes. This was done by lowering the pH of the water. The transfer occurred at a pH between 2 and 3 in the case of n-butyl alcohol when dilute nitric acid was gradually added while shaking. With alkanes and alkenes, attempts at such transfers resulted only in flocculation of molybdenum disulfide at the water/liquid interface.

Figure 1A:
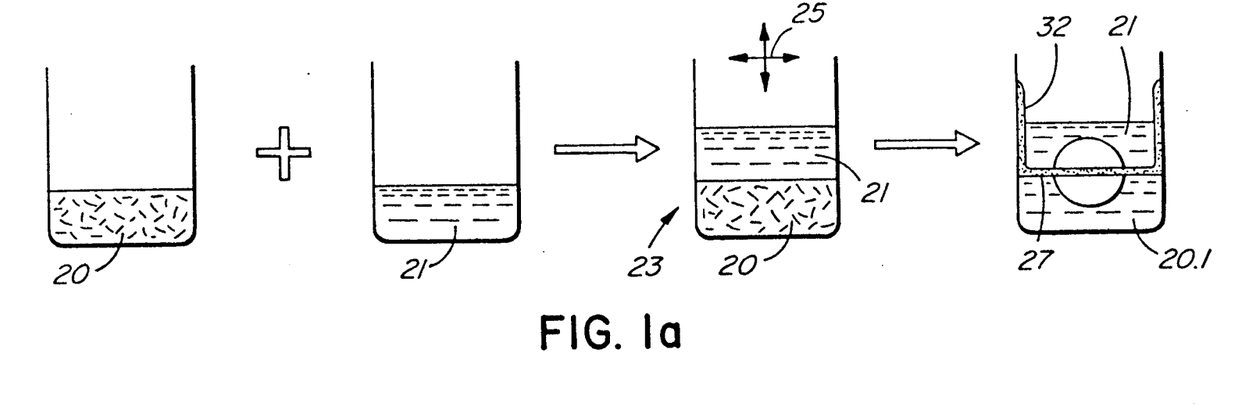
FIG. 1a is a diagrammatic representation of a process for making a thin, oriented film of a transition metal dichalcogenide according to an embodiment of the invention and employing a water immiscible liquid having a specific gravity less than 1.
Figure 1B:
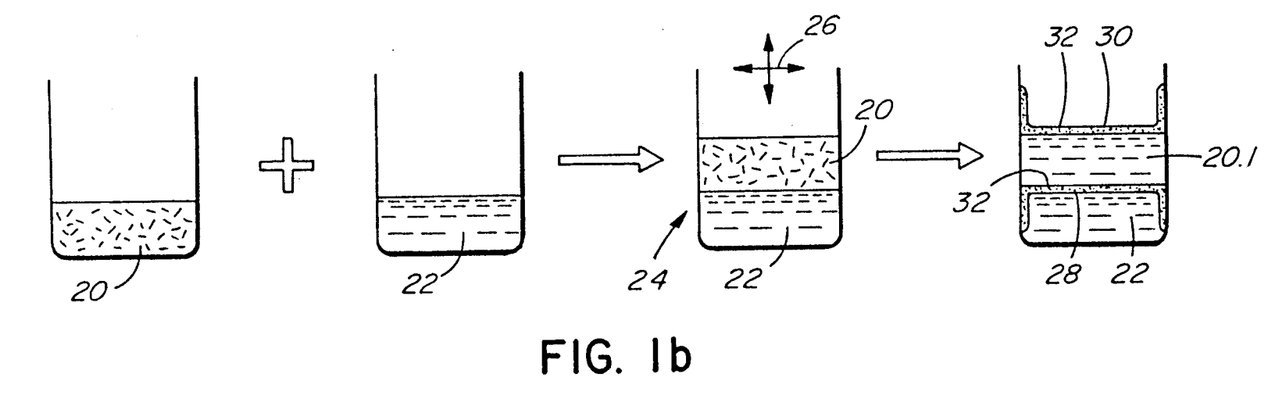
FIG. 1b is a view similar to FIG. 1a showing the process using a water immiscible liquid with a specific gravity greater than 1.

The following are organic solvents with a specific gravity less than 1 were tested:
hexene, alkanes (n= 5 to 12),
benzene, cyclohexane,
n-butyl alcohol, styrene
iso-butyl alcohol, tertiary butyl benzene,
1,3,5-trimethyl benzene FIG. 1b illustrates a variation of the process of FIG. 1a wherein the specific gravity of the water immiscible liquid is greater than 1. Suitable solvents tested were 1,2-dichloroethane, carbon tetrachloride, dimethoxybenzene, 1-chloronaphthelene, and iron pentacarbonyl. In this process, the solvent 22 was mixed with the molybdenum disulfide suspension to form a two-phase liquid 24 which is agitated as indicated by arrows 26. Film accumulation occurred both at water/liquid interface 28 as well as at water/air interface 30. However, it was found that mercury does not work.

Figure 11A:
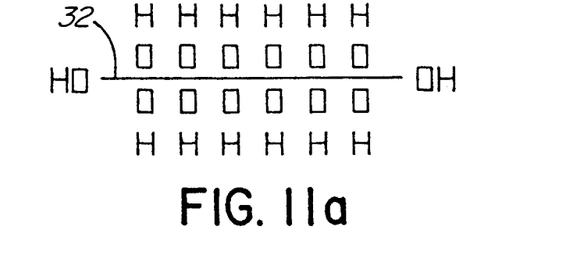
FIG. 11a is a proposed model of single layers of molybdenum disulfide in water.

Referring to FIG. 11a, this shows one of the single layers of molybdenum disulfide 32 contained within the water suspension 20 of FIGS. 1a and 1b. While we do not wish to be bound to this theory, it is believed that each of the single layers 20 possesses a net negative charge due to surface hydration represented in FIG. 11a by the $OH^-$ ions. There are several indications of this. The exfoliated molybdenum disulfide particles show a net drift towards the anode in an electrophoresis apparatus when a voltage is applied across the electrodes. In addition, the presence of a negative surface charge on the basal plane is indicated by the fact that the molybdenum disulfide particles do not flocculate if suspended in water of pH greater than approximately 2. This suggests that this is the point of zero charge (pzc) of the exfoliated particles. With higher pH, $OH^-$ groups are adsorbed on the particles, leading to inter-particle repulsion which keeps them apart. Finally, the exfoliated compound has been observed to be readily adsorbed onto positively charged particles. Introduction of alumina powder to a suspension of exfoliated molybdenum disulfide in an aqueous suspension of pH between the pzc of molybdenum disulfide and that of alumina (approximately 7) was observed to clear the suspension very rapidly. With reference to FIG. 11a, it is believed that the $OH^-$ groups at edge sites are more tightly bound compared with those at the basal plane. This is reasonable because it is well known that the basal planes are less reactive than the edge planes.

Figure 11B:
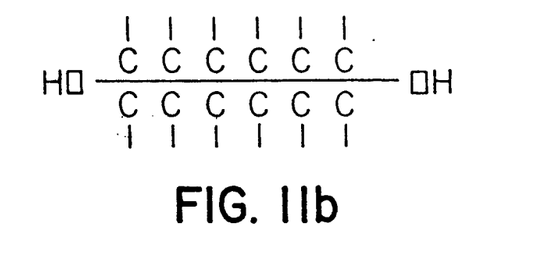
FIG. 11b is a view similar to FIG. 11a and showing the layers as modified by the presence of a water immiscible liquid.

Referring FIG. 11b, this shows the result of mixing an aqueous suspension of exfoliated molybdenum disulfide with a liquid which is immiscible with water and agitating the resulting mixture as described above. It is suggested that shaking brings the immiscible liquid in ready contact with the hydrated particles of molybdenum disulfide and this induces displacement of the hydroxyl ions adsorbed on the basal planes by the liquid molecules. At the basal planes, the hydroxyl ions presumably are more loosely bound and are therefore easily displaced. Therefore, the basal regions of the particles are covered by immiscible liquid and the edge regions by the hydroxyl ions as shown in FIG. 11b. This is evidenced by their subsequent migration towards the water/liquid interface. Whether the interface is that of the globules produced immediately after shaking, or the horizontal interface formed later, the molybdenum disulfide is attached to the interface. This attachment suggests that there are regions of the layers that are covered by water and immiscible liquid separately at this stage so that the lowest energy configuration is achieved when the particles can adhere to both the water and immiscible liquid.

Figure 2:
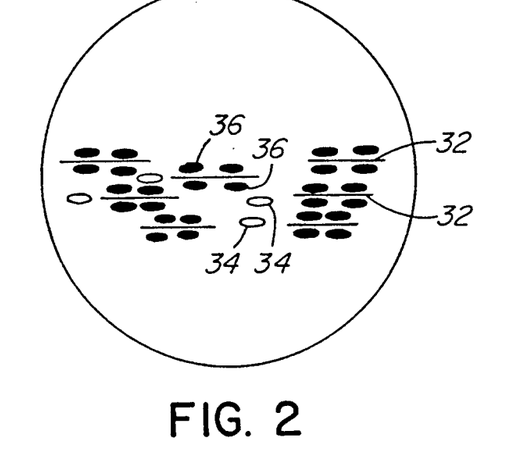

As described above, the first configuration that forms after agitating the two-phase mixture is that of globules encased by molybdenum disulfide layers. These globules are inherently unstable and, in time, coalesce, presumably because the free energy associated with the globules is much higher (proportional to interfacial area of the globules) than that of the final phase-separated mixture with a single horizontal interface between the water and the water immiscible liquid. With the coalescence of globules, the modified single layers of FIG. 11b form a multi layer membrane at the interface. Referring to FIG. 2, this shows in diagrammatic form an enlarged section through the membrane. The layers 32 of molybdenum disulfide are stacked on each other with water molecules 34, identified by while ovals, and liquid molecules 36, identified by black ovals, trapped between them. Based on the above discussion, it can be expected that the immiscible liquid will be non-polar or weakly polar.

It was observed that the suspensions of exfoliated molybdenum disulfide are completely cleared by shaking the mixture, leaving no layers in the water phase. This appears to indicate that all of the hydroxyl groups on the basal planes are replaced by the liquid molecules. If the hydroxyl groups were still present in any significant amount, some degree of dispersion of molybdenum disulfide in water would be expected after shaking.

It has been found that the molybdenum disulfide film at the interface has a tendency to spread. As shown in FIGS. 1a and 1b, the film 32 tends to creep along the walls of a glass container holding the mixture.

It has also been found that the thin film of molybdenum disulfide spreads as a thin layer on wetted surfaces. In particular, referring to FIG. 3b, a pre-cleaned glass slide 38 was wetted after a brief wash with dilute hydrofluoric acid and then dipped into the phase separated mixture such that the lower end just touched the accumulated molybdenum disulfide at the interface of water 20.1 and solvent 21. This resulted in a rapid spreading of a film 32 of molybdenum disulfide up both sides of the slide as illustrated, covering the entire wetted area. After the motion of the film stopped, the slide was withdrawn from solution and was kept hanging vertically in room air for drying. Although the film was apparently dry after a few minutes, it was not completely devoid of water at this stage. However, the resulting film was optically very uniform and highly oriented as determined by x-ray diffraction. The diffraction patterns of the spread films of exfoliated molybdenum disulfide have only one prominent peak, identified as the (001) line, corresponding to a c-spacing of 6.2 angstroms. The lack of other lines suggests that the film consists of the layers with nearly parallel c-axes. In other words, the c-axes of the molybdenum disulfide were substantially parallel and perpendicular to the immediately underlying surface of the substrate. This procedure was tested for both alkanes and alkenes, but was ineffective when butyl alcohol was used. Presumably, spreading required the less polar properties of alkanes or alkenes. Films produced in this manner are hereinafter referred to as "spread films".

Films of molybdenum disulfide were grown on various hydrophilic substrates using this method including glass, ceramics, oxidized copper, oxidized silicon, tungsten trioxide, glass and even cardboard.

A slight variation of the above method is to dip a dry hydrophilic substrate into the phase-separated mixture past the accumulated molybdenum disulfide into the water 20.1. The film was not formed when inserting the glass substrate through the interface 27 into the water 20.1, but a film of molybdenum disulfide was deposited when the substrate, now wet, was withdrawn.

When a hydrophobic substrate, such as PTFE was inserted, a film formed on it, but was restored to the water/organic interface when the substrate was withdrawn.

Figure 9:
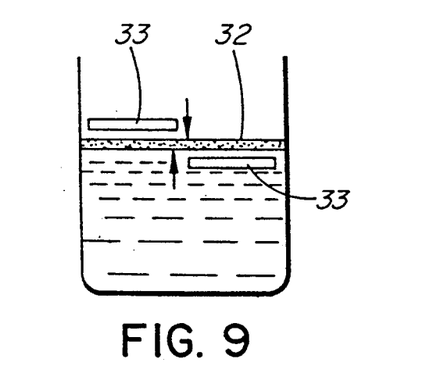
FIG. 9 is a diagrammatic view of a method for coating a hydrophobic substrate with molybdenum disulfide film.

Another method of depositing films tested was to allow the water immiscible liquid to evaporate after the process of FIG. 1a, leaving the molybdenum disulfide film at the air/water interface as shown in FIG. 9.

In FIG. 9 the resulting multi-layer film 32 can be transferred to a hydrophobic substrate 33 by simply touching the film with the substrate oriented horizontally, alternatively from above the film 32 disulfide interface and from below the film 32.

Figure 10:
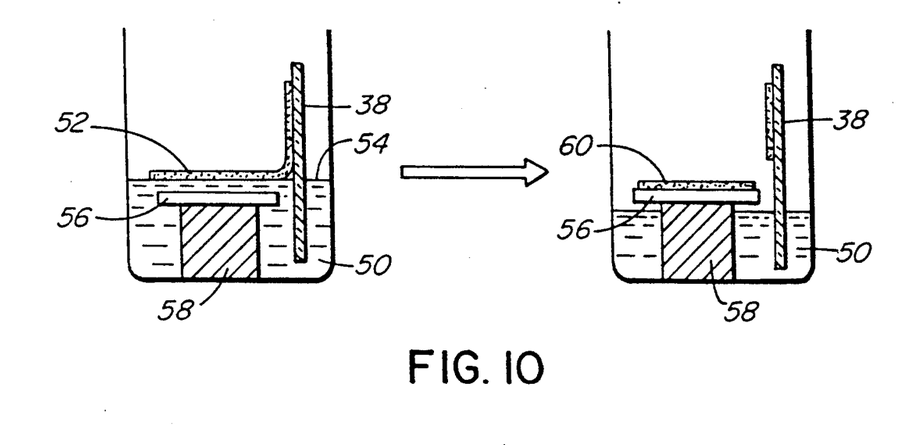
FIG. 10 is a diagrammatic view of a process for transferring a molybdenum disulfide film from one substrate to another.

FIG. 10 illustrates another method used for coating hydrophobic surfaces with film. Following formation of the film using the spreading technique of FIG. 3b, there is a water layer between the film and the substrate. When the substrate was reimmersed into deionized (resistivity greater than 10 Mohm cm) water, the film 52 disengaged itself from the glass slide and re-spread on the air/water interface 54. The hydrophobic substrate 56 was placed on a support 58 in a horizontal position just under the air/water interface 54. The water level was then lowered past the substrate and the film is deposited on a non-polar substrate as shown to the right of the figure. The proportion of the film transferred was directly related to the fraction of the slide which was immersed in water. The substrate 56 with the newly transferred film of molybdenum disulfide 60 was then removed from the container and let dry in room air.

This method of transfer was used with such substrates as PTFE, polystyrene, copper, titanium, aluminum, brass and silicon. Relatively thin films (approximately 30 angstroms) as well as relatively thick films (350 angstroms) have been transferred in this manner. Dilute hydrofluoric acid (approximate 5–10 percent in water) can be used instead of the deionized water as the intermediate medium when transferring films of molybdenum disulfide onto silicon. Keeping the silicon substrate in dilute hydrofluoric acid ensures that the native oxide of silicon is removed, thereby enabling intimate contact between the molybdenum disulfide film and the silicon. The fact that molybdenum disulfide does not react with hydrofluoric acid is of importance here.

Figure 3A:
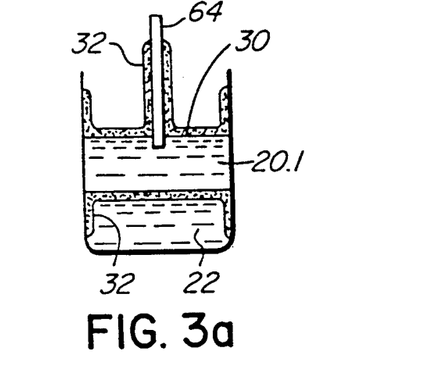
FIG. 3a is a diagrammatic representation of the coating of an object with a film produced by the process of FIG. 1b.
Figure 3B:
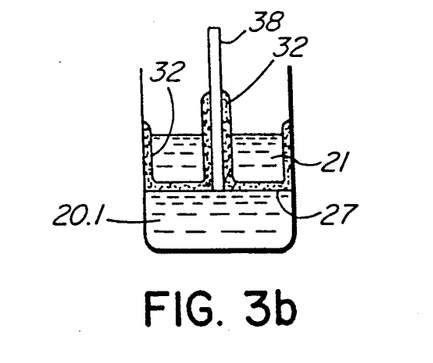
FIG. 3b is a diagrammatic representation of the process of coating of a wet glass slide employing the film produced by the process of FIG. 1b.
Figure 4:
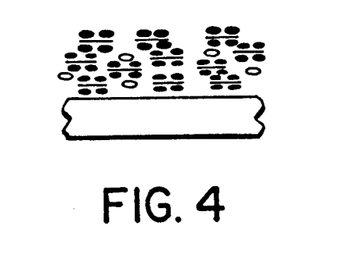
FIG. 4 is an enlarged, diagrammatic representation of a portion of an object coated with a film of transition metal dichalcogenide incorporating water immiscible liquid and water molecules produced by the processes FIGS. 3a or 3b.
Figure 5:
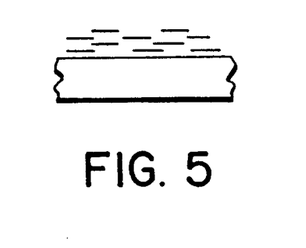
FIG. 5 is a view similar to FIG. 4 showing the object and film after heating.

FIG. 3a illustrates a further method of transferring films when the water immiscible liquid has a specific gravity greater than 1 as previously used in the process of FIG. 1a. In FIG. 3a, the film was deposited directly on to a metal substrate. Freshly etched metals including aluminum, copper or steel 64 were inserted into the water/air interface 30. A coating of molybdenum disulfide was deposited on them. This method could be useful for preparing lubricant coatings on metal surfaces, for example.

In one example styrene was used as the water immiscible liquid to obtain styrene molecules between the $MoS_2$, layers giving a c-spacing of 11.5 angstroms. The composition was subsequently heated to about 60° C. in an inert argon atmosphere to polymerize the styrene into polystyrene. This may be of use in protecting the $MoS_2$, layers.

In another example a mixture of the water immiscible liquid iron pentacarbonyl, $Fe(CO)_5$, and a suspension of single layer $MoS_2$ in water was shaken to produce a composition of $MoS_2$ with iron pentacarbonyl between the $MoS_2$ layers with a c-spacing of 12.0 angstroms. The resulting composition was heated in an inert atmosphere until the iron pentacarbonyl decomposed, releasing carbon monoxide and forming iron between the $MoS_2$ layers. Other metal carbonyls can also be used as the immiscible liquid.

X-ray diffraction measurements confirmed that iron between the layers gave a c-spacing of 6.33 angstroms as compared with 6.13 angstroms for the unexfoliated $MoS_2$. Novel compositions of $Fe_x MX_2$, wherein M is Nb, Mo, Ta or W and X is S or Se with varying x, can be obtained using this method. This technique could potentially be extended to obtain compositions of $MX_2$, with many other metals between the layers.

Instead of using merely a water immiscible liquid as described above, it is possible to dissolve other solutes in the liquid. For example, referring to FIGS. 7–8, ferrocene was dissolved in benzene and, alternatively in, carbon tetrachloride to produce films shown in FIGS. 7 and 8 that included ferrocene 76 between the molybdenum disulfide layers 74. The resulting films are highly oriented as shown by x-ray diffraction. The orientation is much better than obtained with organic solvent alone. Additionally, the presence of ferrocene between the layers makes the resultant films on substrates electrically more conducting. The insertion of ferrocene into the interlayer spacing of molybdenum disulfide is by itself novel and cannot be done with conventional intercalating techniques. Inclusions such as other metallocenes, dyes, monomers and liquid crystals can be included in layered transition metal dichalcogenide films by this technique. Intercalated complexes of $NbS_2$ and $TaS_2$ existed prior to the invention, but not $MoS_2$ and $WS_2$ intercalated with organic materials.

Figure 6:
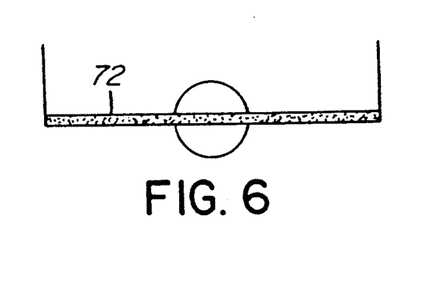
FIG. 6 is a diagrammatic side view of the metal dichalcogenide film shown after drying.
Figure 7:
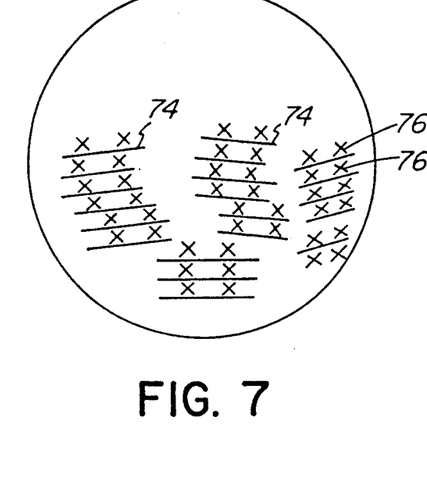
FIG. 7 is an enlarged view of the portion within a circle of FIG. 6 showing ferrocene between the layers of metal dichalcogenide.
Figure 8:
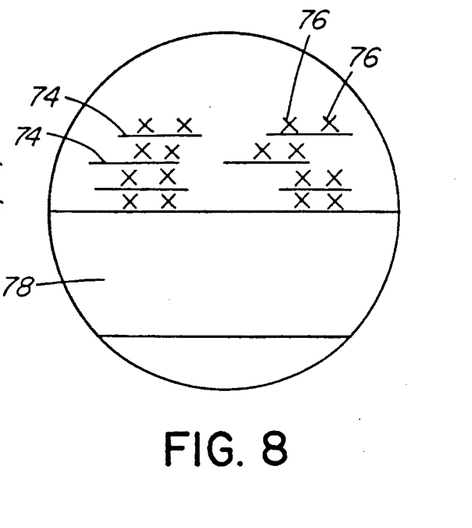
FIG. 8 is an enlarged diagrammatic view of an object coated with a film of transition metal dichalcogenide incorporating ferrocene shown after baking.

To produce a powered material with ferrocene included between the $MoS_2$ layers, with reference to FIG. 1a, the water 20.1 was decanted and the water immiscible liquid 22 was pipetted. In the case of FIG. 1b, the liquid 21 was evaporated and the water 20.1 pipetted. The resultant composition was dried in room air. The result was a powder 72 of molybdenum disulfide as shown in FIG. 6. The enlarged view of FIG. 7 shows that the powder includes a plurality of layers 74 of $MoS_2$ with molecules 76 of ferrocene, represented by x's, between the layers The resultant composition can be identified by the formula $MX_2:Y$, where Y is the ferrocene. This was in powder form. FIG. 8 shows a molybdenum disulfide film incorporating ferrocene molecules coating a substrate 78 via the processes described above. It should be noted that there is only a single layer of ferrocene molecules between the layers of molybdenum disulfide instead of two layers of liquid molecules as shown in FIG. 2.

Besides ferrocene, other possible solutes are copper phthalocyanine (CuPc), phthalocyanine (Pc), stearamide, and chrysene. Below is a table of films produced with molybdenum disulfide using a particular solvent and a solute dissolved in the solvent. Large area films can be produced using the above method.

| | Solvent | Solute | Properties and Uses |
|---|---|---|---|
| 1. | benzene, carbon tetrachloride | ferrocene | Highly oriented, and better electrical conductivity. Powder may have applications as a catalytic material. |
| 2. | benzene, hexene 1-chloronaphthalene | Phthalocyanine dyes, CuPc, Pc etc. | Blue color films, possible gas sensing ability. |
| 3. | benzene, hexene | chrysene | whitish film, fluorescent film, purple fluorescence upon exposure to ultra-violet radiation. |
| 4. | hexene | stearamide | widely separated $MoS_2$ layers. |

Figure 12:
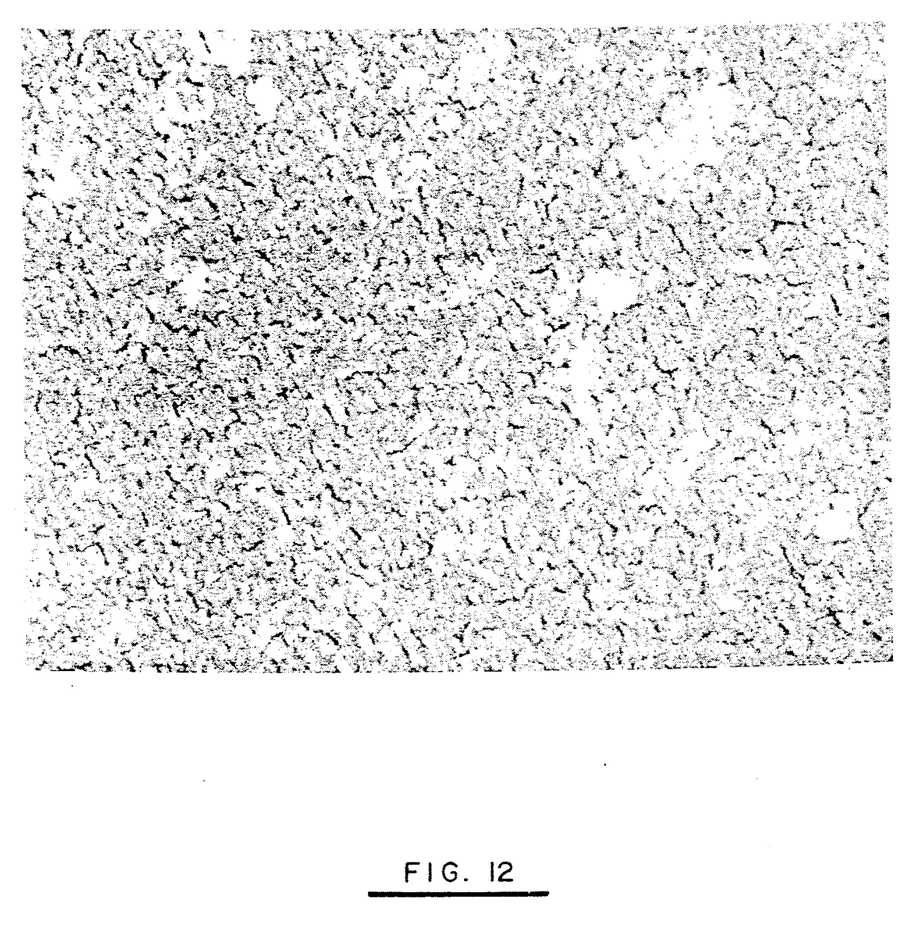
FIG. 12 is an SEM micrograph of a spread film of exfoliated molybdenum disulfide.

MEASUREMENTS OF FILMS Referring FIG. 12, this is a SEM micrograph of a film obtained from a suspension of exfoliated molybdenum disulfide prepared using 1-hexene as the water immiscible liquid. The thickness of the films prepared ranged from 30 angstroms to a few microns, the thickness being measured by various techniques. The thickness of the spread films can be somewhat controlled by the concentration of the initial molybdenum disulfide suspension. Higher values were measured by interference fringe method using a Wild (T. M.) model M20 interference microscope with a narrow band-pass filtre at 550 nm. In addition, this method showed that the measured films were of high optical quality with the observed fringe patterns were straight and devoid of any other observable structure on the entire surface area. A Perkin-Elmer (T. M.) Model 595 scanning Auger microprobe (SAM) was used to provide depth profiles of thin films. Samples measured by this technique showed thicknesses down to about 30 angstroms.

Figure 13:
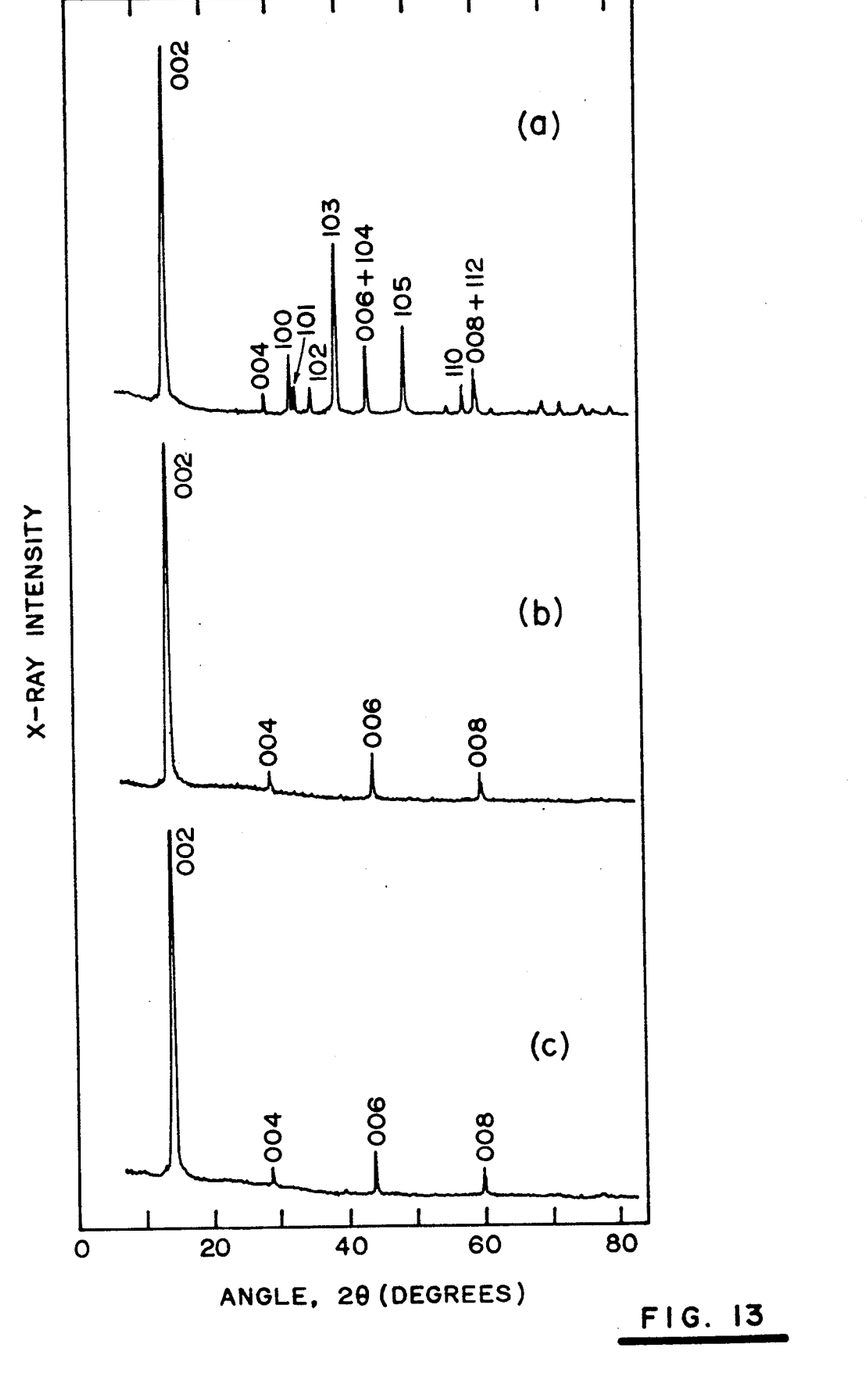
FIG. 13 is a graph of the x-ray diffraction patterns of a film of un-exfoliated $MoS_2$ powder prepared by (a) air-drying a few drops of a suspension having crystallites of random orientations,
(b) a spreading technique using 1-hexene with oriented crystallites, and
(c) the same film as (b) transferred to a new glass substrate.

FIG. 13 shows x-ray diffraction patterns for films spread on glass obtained using a Philips (T. M.) diffractometer using nickel-filtered $Cu_{cc}K$ radiation. FIG. 13(a). shows a diffraction pattern for film prepared from as-received $MoS_2$ powder. FIG. 13(b) is for film of unexfoliated molybdenum disulfide deposited on glass by the method of spreading using 1-hexene. Here, the resulting film is seen to be highly oriented in that the crystallites of the film are placed on the substrate such that all basal planes are parallel to each other. This is indicated by the fact that only (001) lines are present in the diffraction pattern while the (100) and (110) lines are absent. FIG. 13(c) shows a diffraction pattern obtained after transferring the same film to another glass substrate via a clean water surface using the transferring technique shown in FIG. 10. The identical x-ray diffraction patterns suggest that the transfer has introduced no major disruptions in the orientation of the film.

Figure 14:
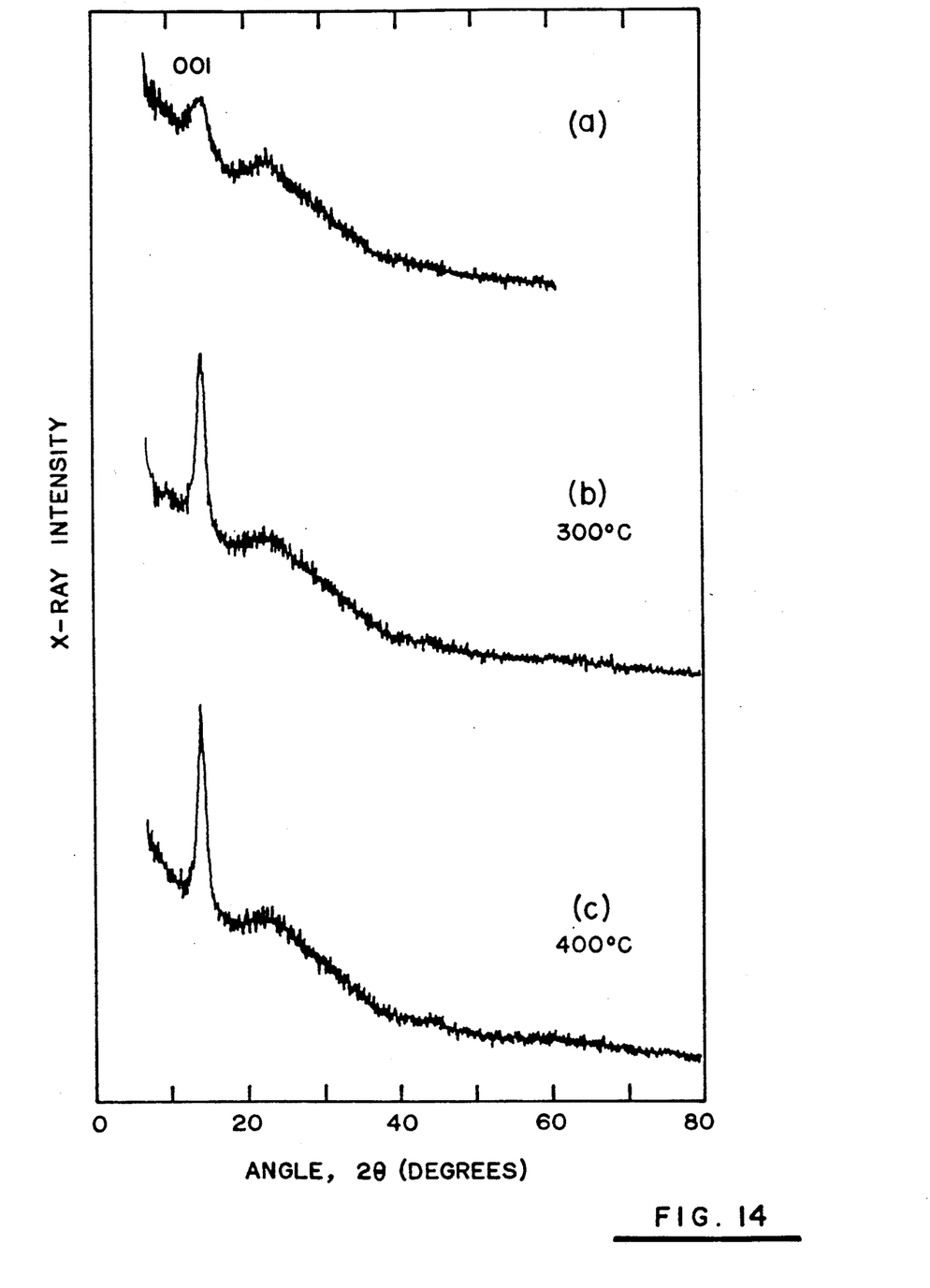
FIG. 14 is a graph of the x-ray diffraction patterns of a film of exfoliated molybdenum disulfide showing the film on a flat glass substrate deposited using hexene
(a) prior to baking,
(b) after baking in argon at 300° C. for 30 minutes; and
(c) after baking at 400° C. for a further 30 minutes.

FIG. 14 shows a sequence of x-ray diffraction patterns for a film of exfoliated molybdenum disulfide on a flat glass substrate prepared using the interface between n-butyl alcohol and water, baked at various temperatures in a flow of pre-purified argon. It was observed that baking at increasingly higher temperatures in an inert atmosphere sharpened the (001) peak. The higher orders are not seen and are most probably are buried in the signal from the substrate as is usual for a thin film. The broad hump around 23° is due to the substrate.

Figure 15:
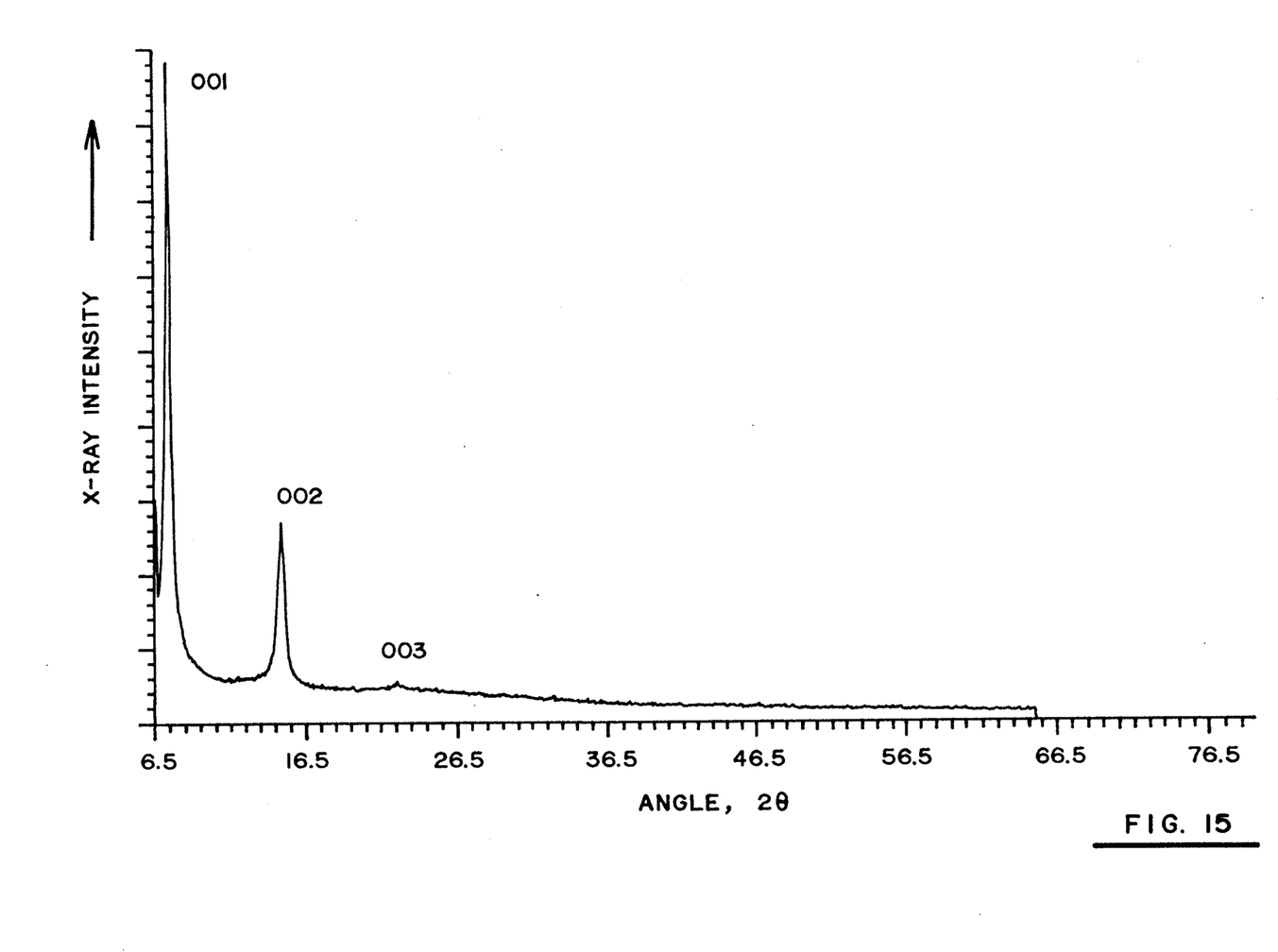
FIG. 15 is a graph of the x-ray diffraction pattern of a film of exfoliated $MoS_2$ on a flat glass substrate, with ferrocene included between the $MoS_2$ layers.

FIG. 15 shows an x-ray diffractogram of a film of exfoliated $MoS_2$ on a flat glass substrate prepared by using the interface between a solution of ferrocene in $C_6H_6$ and water. Three peaks identified as (001), (002) and (003) with a c-spacing of 11.8 angstroms indicated that a monolayer of ferrocene is included between the layers of $MoS_2$.

Figure 16:
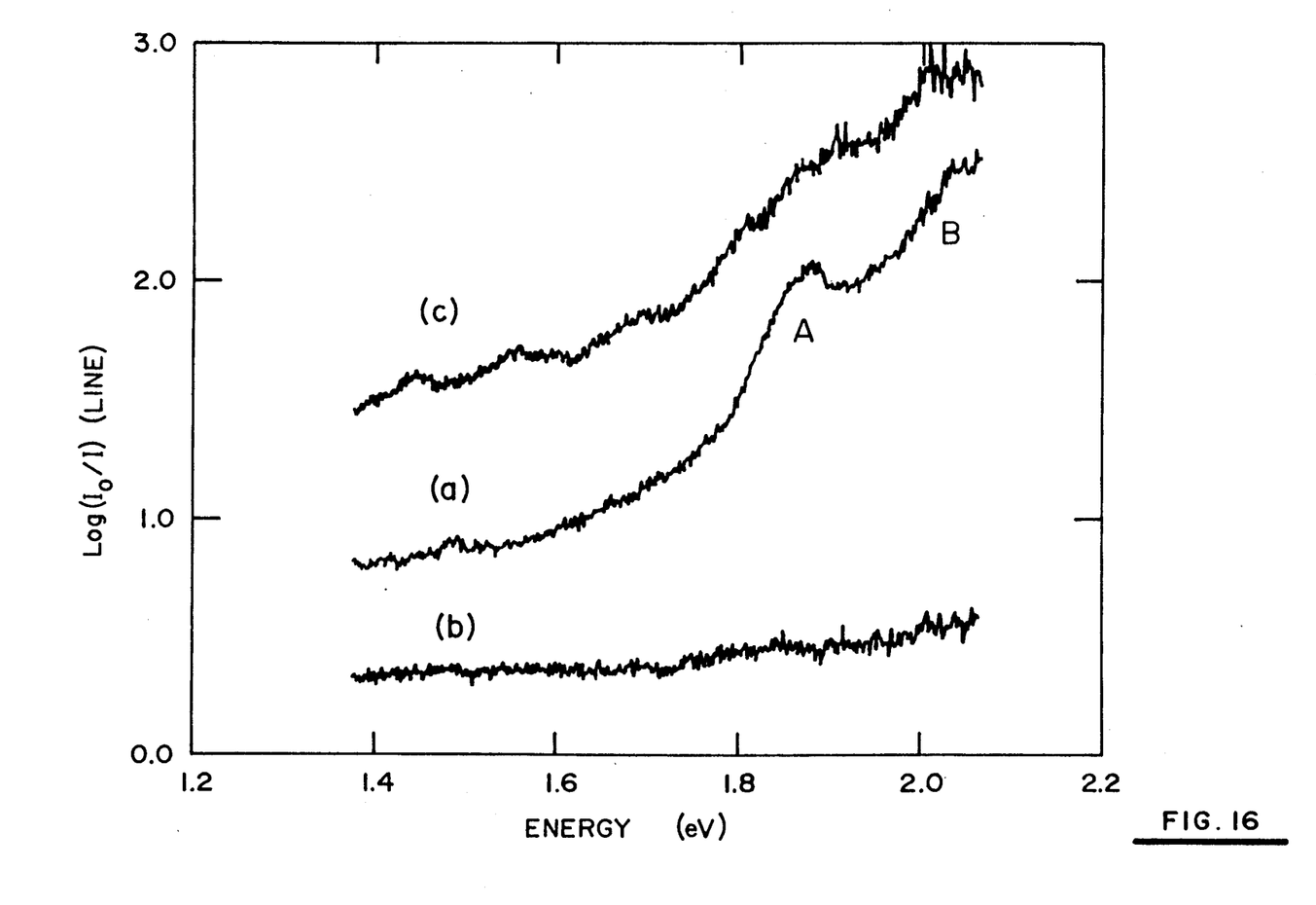
FIG. 16 is a diagram of optical absorption for
(a) a suspension of single crystal molybdenum disulfide in water,
(b) for a film of exfoliated molybdenum disulfide spread using benzene and
(c) for the same film after baking.

FIG. 16 shows optical absorption spectra of films obtained using an Oriel monochromator and detector. Curve "a" is the absorption spectra of a suspension of fine $MoS_2$ crystallites in water showing the true characteristic exciton peaks labelled "A" and "B". The curve marked "b" is of a film of exfoliated molybdenum disulfide on a flat glass substrate. Curve "c" is that of the same film after heating to 300° C. for 15 minutes in an argon atmosphere. The reappearance of the band gap absorption (approximately 1.8 eV) as indicated by curve "c" suggests that the exfoliated molybdenum disulfide has been at least partially restored to normal molybdenum disulfide by the heat treatments. The film in FIG. 16b was gray in colour with a slight green tinge. The film in FIG. 16C was green.

The spreading techniques for coating substrates with films is believed to be the result of a surface tension gradient. This results from attractive forces between hydroxyl groups at the edge sites of the molybdenum disulfide layers and a thin layer of water on the glass slide or other hydrophilic materials. On the other hand, the cohesive forces between the water immiscible liquid molecules adsorbed on the basal planes of the molybdenum disulfide and the molecules of the hydrophobic substrates are believed to be responsible for spreading films on PTFE, polystyrene and the like. The surface tension model also seems to account for the observation that while the films of molybdenum disulfides spontaneously spread on wet slide from the alkane/water and 1-hexene/water interfaces, they do not spread from an alcohol/water interface. The reason for the above difference may lie with a vastly different interfacial tension of the two liquid/water systems.

The optical uniformity and high orientation in the spread films make them very attractive considering the simplicity in preparation. The fact that good quality films can be obtained on a variety of substrates even with unexfoliated, as-received material in the form of a powder is also of interest.

Preparation of oriented films of metal dichalcogenides may be of some practical importance in instances such as in electrodes in electrochemical solar cells where oriented films of $MoS_2$ have the decided advantage as suggested by G. Djemal, N. Muller, U. Lachish and D. Chen, Solar Energy Materials, 5 (1981) 403.

Recent work [P. D. Fleishauer, Thin Solid Films, 154 (1987) 309] has shown that molybdenum disulfide sputtered films with basal planes parallel to the substrate have superior lubricating properties compared to those with slip planes randomly oriented. Moreover, the former type of films pose a higher resistance to degradation due to environmental attack than the latter type. Hence, the techniques described here in preparing molybdenum disulfide films with high c-axes parallelism may be of some importance with regards to lubricants.

What is claimed is:

1. A process for forming sheet-like compositions of the formula:

$$MX_2 \cdot Y$$

wherein $MX_2$ is a layer-type transition metal dichalcogenide, M is a metal selected from the group consisting of niobium, tantalum, molybdenum and tungsten, X is a chalcogen selected from the group consisting of sulfur and selenium and Y is a material located between layers of $MX_2$, which comprises the steps of:
  (a) forming a suspension of $MX_2$ in a body of water;
  (b) adding a non-metallic liquid which is immiscible with water to the suspension;
  (c) agitating the mixture to form a temporary emulsion;
  (d) allowing the emulsion to rest until the water and the immiscible liquid separate with an interface therebetween and a sheet-like composition of $MX_2{:}Y$ forms at said interface.

2. A process as claimed in claim 1, further comprising the step of removing the $MX_2{:}Y$ from the body of water and the immiscible liquid.

3. A process as claimed in claim 1, wherein the $MX_2$ is provided in the form of platelets.

4. A process as claimed in claim 1, wherein the $MX_2$ is provided in layers having a single molecular thickness.

5. A process as claimed in claim 1, wherein the immiscible liquid is selected with a density less than the density of water.

6. A process as claimed in claim 5, wherein the water immiscible liquid is selected from the group consisting of hexene; alkanes (n= 5 to 12); 1, 1-dichloroethane; iso-butyl alcohol; n-butyl alcohol; benzene; cyclohexane; 1,2,5-trimethylbenzene; and tertiary butyl benzene.

7. A process as claimed in claim 6, wherein the immiscible liquid selected is styrene, the process further comprising the step of heating the $MX_2{:}Y$ to polymerize the styrene between the layers of $MX_2$.

8. A process as claimed in claim 6, wherein the immiscible liquid is a liquid metal carbonyl.

9. A process as claimed in claim 8, wherein the immiscible liquid is iron pentacarbonyl, the process further comprising the step of heating the $MX_2{:}Y$ to decompose the iron pentacarbonyl to form iron between the layers of $MX_2$.

10. A process as claimed in claim 1, wherein the immiscible liquid is selected with a density greater than the density of water.

11. A process as claimed in claim 10, wherein the immiscible liquid is selected from the group consisting of 1,2-dichloroethane; carbon tetrachloride; dimethoxy benzene; 1-chloronaphthalene; and iron pentacarbonyl.

12. A process as claimed in claim 1, further comprising the step of adding acidic material to the water so the pH is between 2 to 7.

13. A process as claimed in claim 1, wherein Y includes water and the immiscible liquid between layers of the $MX_2$.

14. A process as claimed in claim 13, wherein Y further includes a solute.

15. A process as claimed in claim 14, wherein the solute is selected from a group consisting of ferrocene, 1,2-diferrocenylethane; chrysene; stearamide; phthalocyanine and copper phthalocyanine;

16. A process as claimed in claim 14, wherein the $MX_2:Y$ is heated in an inert atmosphere to remove the water and immiscible liquid and leave the solute between the layers of $MX_2$.

17. A process as claimed in claim 13, further comprising the step of drying the $MX_2:Y$ to remove the Y from the $MX_2$.

18. A method of coating an object, comprising:
forming a sheet-like composition at an interface between water and a non-metallic liquid which is immiscible with water, the composition having the formula:

$MX_2 \cdot Y$ wherein $MX_2$ is a layer-type transition metal dichalcogenide, the M is selected from the group consisting of niobium, tantalum, molybdenum and tungsten; X is selected from the group consisting of sulfur and selenium, and Y is a material located between layers of $MX_2$; and
bringing the object into contact with the sheet-like composition and allowing the composition to spread over the object.

19. A method as claimed in claim 18, wherein the $MX_2$ is crystalline with c-axes perpendicular to the substrate.

20. A composition having the formula:

$MX_2 \cdot Y$ wherein $MX_2$ is a layer-type transition metal dichalcogenide selected from the group consisting of molybdenum disulfide and tungsten disulfide; and Y is an organic material located between layers of $MX_2$.

21. A composition as claimed in claim 20, wherein the $MX_2$ is in the form of single molecular thickness sheets.

22. A composition as claimed in claim 21, wherein Y is a monolayer of a metallocene molecules.

23. A composition as claimed in claim 22, wherein the metallocene is selected from the group consisting of ferrocene and 1,2-diferrocenylethane.

24. A composition as claimed in claim 20, wherein Y is selected from a group consisting of hexene; alkanes (n= 5 to 12); 1,2-dichloroethane; iso-butyl alcohol; n-butyl alcohol; cyclohexane; benzene; styrene; 1, 3-5 trimethylbenzene; tertiary butyl benzene; 1,2-dichloroethane; carbon tetrachloride; dimethoxy benzene; 1-chloronaphthalene; chrysene; stearamide; phthalocyanine; copper phthalocyanine and iron pentacarbonyl.

25. A object having a surface coated with a composition having the formula:

$MX_2 \cdot Y$ wherein $MX_2$ is a layer-type transition metal dichalcogenide, M is a metal selected from the group consisting of niobium, tantalum, molybdenum and tungsten, X is a chalcogen selected from the group consisting of sulfur and selenium, and Y is an organic substance located between layers of $MX_2$, the $MX_2$, being crystalline with c-axes perpendicular to the surface of the object.

26. An object as claimed in claim 25, wherein the $MX_2$ is in the form of single molecular layers.

* * * * *